United States Patent [19]

Kubo et al.

[11] Patent Number: 5,079,828
[45] Date of Patent: Jan. 14, 1992

[54] AUTOMATIC TOOL-REPLACEMENT APPARATUS

[75] Inventors: Haruaki Kubo; Yoshiyuki Kamanaka, both of Nara; Genichi Sato, Aichi; Yutaka Kitaoka, Mie, all of Japan

[73] Assignee: Daishowa Seiki Kabushiki Kaisha, Osaka, Japan

[21] Appl. No.: 492,859

[22] Filed: Mar. 13, 1990

[30] Foreign Application Priority Data

Mar. 14, 1989 [JP] Japan .................................. 1-61878

[51] Int. Cl.⁵ .......................................... B23Q 3/157
[52] U.S. Cl. ....................................... 29/568; 408/61; 409/136
[58] Field of Search .............. 29/568; 83/168; 408/60, 408/61; 409/136

[56] References Cited

U.S. PATENT DOCUMENTS

| | | | |
|---|---|---|---|
| 3,530,570 | 9/1970 | Shotter | 29/568 |
| 3,550,487 | 12/1970 | Randall et al. | 29/568 |
| 3,571,912 | 3/1971 | Kielma | 29/568 |

FOREIGN PATENT DOCUMENTS

| | | |
|---|---|---|
| 305616 | 3/1989 | European Pat. Off. . |
| 3330442 | 12/1984 | Fed. Rep. of Germany . |
| 248537 | 8/1987 | Fed. Rep. of Germany . |
| 56-126549 | 10/1981 | Japan . |
| 59-7538 | 1/1984 | Japan . |
| 0053141 | 3/1984 | Japan ..................................... 83/168 |
| 0292344 | 12/1987 | Japan ..................................... 408/61 |

Primary Examiner—Z. R. Bilinsky
Attorney, Agent, or Firm—Sixbey, Friedman, Leedom & Ferguson

[57] ABSTRACT

An automatic tool-replacement apparatus including the main body of a machine tool on which a plurality of tools can be dismountably mounted. The tools are selectively held by an automatic tool-replacement arm and are mounted on or dismounted from the main body. The arm has a plurality of holding portions for holding the tools. Therefore, a plurality of tools can be mounted on or dismounted from the main body of the machine tool by one-time operation of a single arm. Each holding portion has a pawl for preventing disengagement of the tool positioned therein, this pawl being able to advance toward and retract away from the holding portion.

9 Claims, 3 Drawing Sheets

AUTOMATIC TOOL-REPLACEMENT APPARATUS

BACKGROUND OF THE INVENTION

1. Field of the Invention

The present invention relates to an apparatus for automatically replacing tools. More specifically, the present invention relates to the structure of an automatic tool-replacement arm used in the so-called machining center.

2. Description of the Related Art

In recent years, the so-called machining center has often been used to automatically and efficiently carry out machining work such as cutting or grinding. The machining center is adapted to select a suitable machining tool in accordance with the type of the necessary machining work, and automatically mount the selected tool onto the spindle on the main body of the relevant machine tool, so that machining work is performed using the tool. An automatic tool-replacement arm and other mechanisms are provided to mount and dismount tools.

The machining work may be performed in various conditions in the machining center. For instance, the number of the machining tool mounted on the main body thereof may not necessarily be one; in some cases, a single machining tool may be mounted, whereas in other cases, a plurality of machining tools may be juxtaposed so that they will perform machining operations simultaneously. Furthermore, a nozzle for supplying a coolant to each machining tool may also be disposed.

An arm serving as the conventional automatic tool-replacement mechanism is mainly capable of the following functions: holding one particular tool to mount it on or dismount it from the main body of the machine tool; returning the dismounted tool to a magazine positioned adjacent to the main body of the machine tool; and holding a new tool to mount it on the main body of the machine tool.

Therefore, when a plurality of tools are mounted on the main body of the machine tool, the following problem may arise. If some or all of the plurality of tools have to be, for instance, replaced, the replacement work cannot be completed at one time, more specifically, by one travel of the automatic tool-replacement arm. Thus, replacement work requires a long time. In order to complete the replacement work within a short time, a plurality of automatic tool-replacement arms might be provided. This, however, may lead to inevitable increase in the size of the entire apparatus.

SUMMARY OF THE INVENTION

The present invention has been accomplished in view of the above-described problem. An object of the present invention is to provide an automatic tool-replacement apparatus including the main body of a machine tool on which a plurality of tools may be dismountably mounted, the apparatus being capable of completing the work of mounting or dismounting tools by one-time operation of a single automatic tool-replacement arm even when the plurality of tools must together be mounted on or dismounted from the main body of the machine tool, hence, capable of simplifying the work and achieving improved efficiency.

In order to achieve the above-stated object, an automatic tool-replacement apparatus according to the present invention comprises: a machine tool; a plurality of tools adapted to be juxtaposed and dismountably mounted on a body of the machine tool; and an automatic tool-replacement arm for holding the tools so that the tools will be mounted on the body of the machine tool or dismounted therefrom, the arm having a plurality of holding portions for holding the plurality of tools.

According to the present invention, the automatic tool-replacement arm has a plurality of tool holding portions formed therein. By virtue of this arrangement, when a plurality of tools positioned at a certain location are to be mounted or dismounted, the arm moves to that location, and the plurality of tools are held by the sole arm. Thus, the mounting or dismounting of the desired necessary tools can be completed by one-time operation of the arm.

The tools may include a coolant ejection nozzle as well as machining tools.

DESCRIPTION OF THE PREFERRED EMBODIMENTS

The present invention will now be described with respect to the preferred embodiments thereof which are illustrated in the accompanying drawings.

Figure 1:
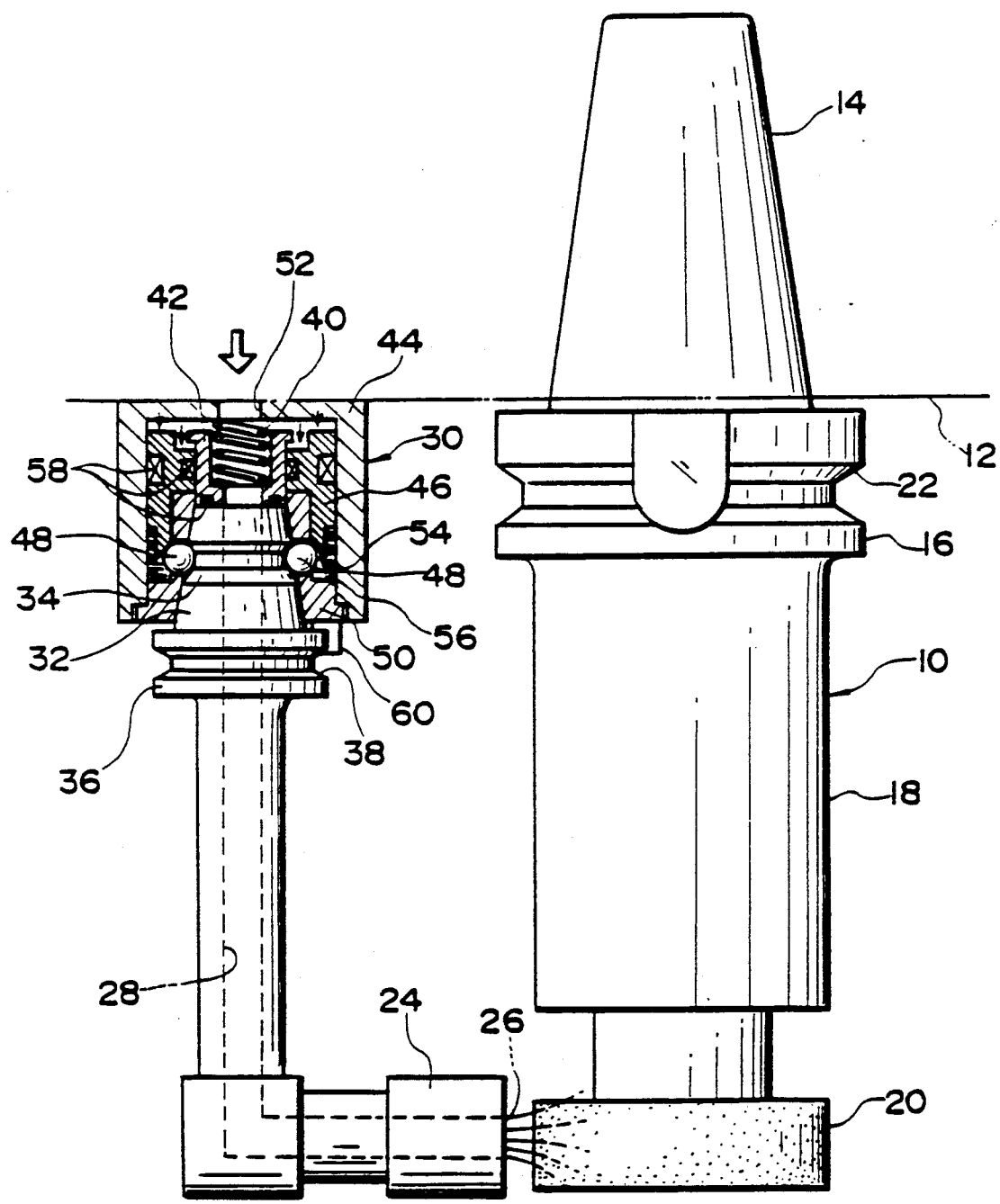
FIG. 1 is a partially cut-away plan view of an example of a structure for mounting tools to the main body of a machine tool that is used in an automatic tool-replacement apparatus according to the present invention.

FIGS. 1 to 5 illustrate embodiments of the present invention in which machining tools comprise grinding wheels by way of example. As shown in FIG. 1, a tool holder 10 has, at its proximal end portion, a taper shank 14 connectable to the spindle head (not shown) of the main body 12 of a machine tool such as a machining center. The tool holder 10 also has a flange portion 16 integrally continuing from the taper shank 14, and a holder shell 18 between the flange portion 16 and the distal end of the holder 10. A machining tool 20, such as a grinding wheel, is provided at the forward end (i.e., the lower end, as viewed in FIG. 1) of the holder shell 18. The flange portion 16 has an engagement groove 22 formed on the outer periphery thereof. The engagement groove 22 functions as a position determining groove when the tool holder 10 is being joined to the spindle head, and the groove 22 allows an automatic tool-replacement arm, described later, to engage therewith.

A coolant ejection nozzle 24 is bent so that its overall configuration is substantially L-shaped. An opening 26 of the nozzle 24 is positioned while facing the machining tool 20. A coolant passage 28 communicating with the opening 26 is formed in the nozzle 24 along the axis thereof. The nozzle 24 is separate from the tool holder 12, and is independently and dismountably mounted on the main body 12 of the machine tool.

More specifically, a nozzle mounting block 30 is fixed to the main body 12 of the machine body, and this block 30 allows the nozzle 24 to be mounted thereto. Coolant at high pressure is introduced from the main body 12 of the machine tool through the mounting block 30 into the coolant passage 28. In order to prevent the nozzle 24, which receives coolant at high pressure, from falling off the mounting block 30, a fall-prevention mechanism is provided at the proximal end portion of the nozzle 24 and inside the mounting block 30.

More specifically, the proximal end portion of the nozzle 24 terminates in a nozzle taper shank 32 tapering off toward the proximal end (i.e., the upper end, as viewed in FIG. 1), thereby facilitating the insertion of this end portion into the mounting block 30. A ball-receiving groove 34 is formed around an intermediate portion of the outer periphery of the taper shank 32. A flange portion 36 has an engagement groove 38 formed on the outer periphery thereof. The engagement groove 38 functions as a groove for determining of the position of the nozzle 24 relative to the mounting block 30, and it allows the automatic tool-replacement arm to engage therewith.

The mounting block 30 mainly comprises a stopper sleeve 42 urged by a coil spring 40 toward the distal end (i.e., downward, as viewed in FIG. 1) and provided to regulate the axial position of the nozzle 24, a pushing sleeve 46 disposed between the outer periphery of the stopper sleeve 42 and the inner periphery of the main body 44 of the mounting block 30 and capable of sliding axially, and an inner sleeve 50 fixed to the main body 44 while supporting a plurality of engagement balls 48 and having its inner periphery tapered and shaped to correspond to the taper shank 32 of the nozzle 24. A coolant inlet 52 is formed through the bottom of the main body 44. When coolant at high pressure is introduced from the inlet 52, as indicated by a white arrow in FIG. 1, the pressure of the coolant acts on the proximal end face (i.e., the upper surface, as viewed in FIG. 1) of the pushing sleeve 46, as indicated by black arrows, thereby causing the pushing sleeve 46 to slide downward. As the sleeve 46 slides downward, a tapered pushing surface 54 formed at the distal end of the sleeve 46 pushes the engagement balls 48 radially inwardly, thereby pressing the balls 48 against the ball-receiving groove 34 formed in the taper shank 32 of the nozzle 24 inserted into the inner sleeve 50. The pushing sleeve 46 is normally urged by a coil spring 56 toward its proximal end. In this condition, therefore, the engagement balls 48 are supported by the inner sleeve 50 while retracted at their radially outward position. Denoted at 58 are sealing members. A position determining pin 60 projects from an end face of the inner sleeve 50 to engage with an engagement groove (not shown) formed in the flange portion 36 of the nozzle 24.

Accordingly, with the nozzle 24 being inserted into the mounting block 30, when coolant at high pressure introduced from the inlet 52 of the main body 44 passes through the space inside the stopper sleeve 42 and it passes through the coolant passage 28 within the nozzle 24 to be ejected from the opening 26, the pressure of the coolant is utilized to press the engagement balls 48 against the ball-receiving groove 34 on the taper shank 32 of the nozzle 24. At this time, therefore, the nozzle 24 is held to the mounting block 30 with a greater force, and it is thus prevented from falling off.

Figure 2:
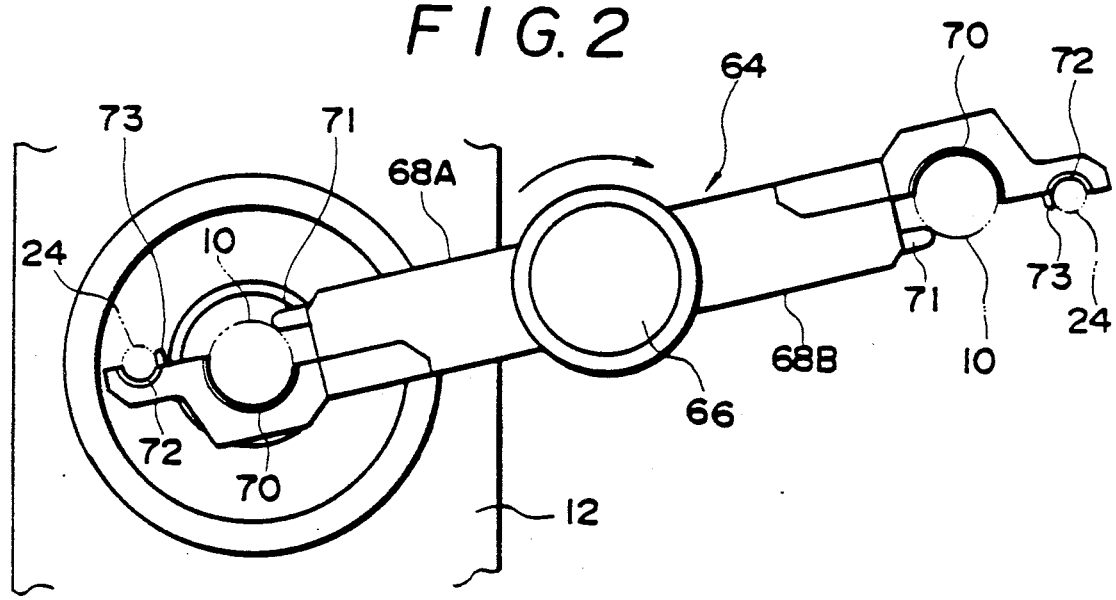
FIG. 2 is a bottom view of the structure shown in FIG. 1, showing an automatic tool-replacement arm of one embodiment of the present invention.
Figure 3:
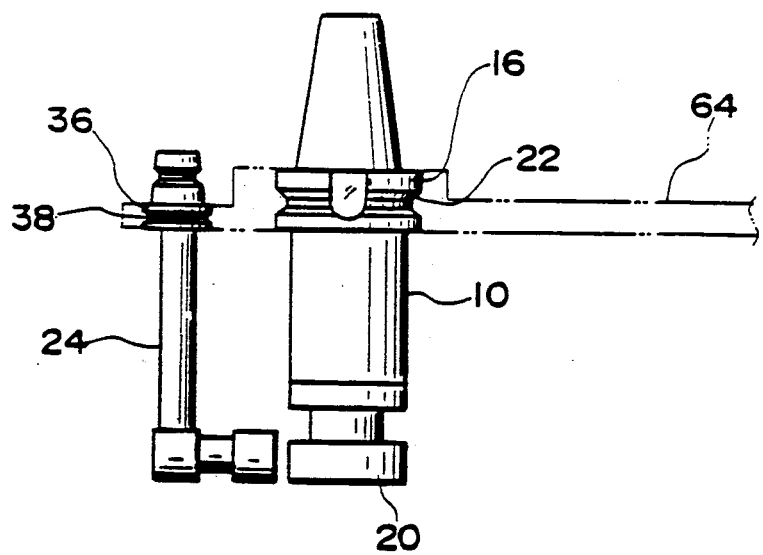
FIG. 3 is a view showing a state in which tools are held by the arm shown in FIG. 2.

FIG. 2 shows the structure of an automatic tool-replacement arm 64 applicable when a nozzle 24, such as that shown in FIG. 1, is mounted separately from a tool holder 10. FIG. 3 shows the state of a tool holder 10 and a nozzle 24 being held by the arm 64.

The automatic tool-replacement arm 64 has a rotary shaft 66 adjacent to the main body 12 of the machine tool. A pair of arm sections 68A and 68B extend from the rotary shaft 66. At the distal end portion of each of the arm sections 68A and 68B, a first holding portion 70 and a second holding portion 72 close to the distal end are formed. The first holding portion 70 is capable of coming into engagement with the engagement groove 22 on the flange portion 16 of the tool holder 10, while the second holding portion 72 is engageable with the engagement groove 38 on the flange portion 36 of the nozzle 24 (see FIG. 3). As shown in FIG. 2, pawls 71 and 73 are provided to prevent disengagement of the tools in the corresponding holding portions 70 and 72.

In the state shown in FIG. 2, the first and second holding portions 70 and 72 of the left arm section 68A (as viewed in the figure) of the automatic tool-replacement arm 64 respectively hold a tool holder 11 and a nozzle 24 which have been used on the main body 12 of the machine tool. Simultaneously in this state, the holding portions 70 and 72 of the other arm section 68B respectively hold a new tool holder 10 selected from among a plurality of machining tools in a magazine (not shown), and a new coolant ejection nozzle 24 combined with the selected tool holder 10. When the arm 64 turns round about the rotary shaft 66 to a certain extent, the new machining tool and the new nozzle will be mounted on the main body 12 of the machine tool, whereas the machining tool and the nozzle already used will be returned to predetermined positions in the magazine.

Figure 4:
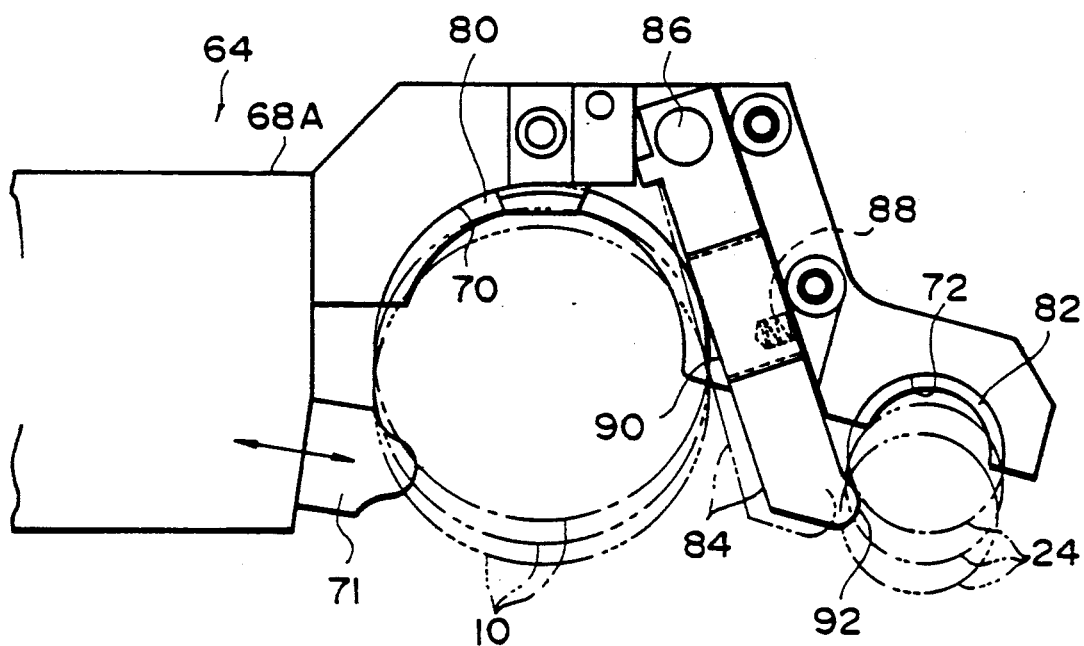
FIG. 4 is an enlarged fragmentary view of an automatic tool-replacement arm of another embodiment, showing holding portions of the arm.
Figure 5:
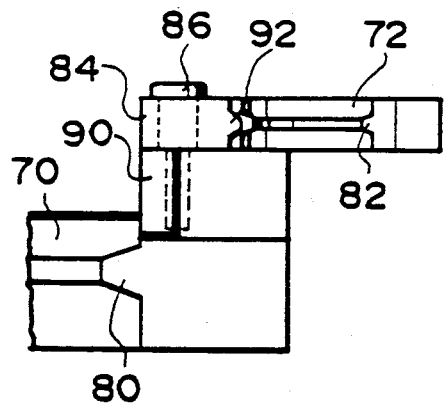
FIG. 5 is a fragmentary view taken in the direction indicated by the arrow V in FIG. 4.

FIGS. 4 and 5 show in detail the structure of the first and second holding portions 70 and 72 in one arm section 68A of the automatic tool-replacement arm 64. Although not shown, the other arm section 68B has the same structure. Each of the holding portions 70 and 72 is a substantially semi-circular recess, and the holding portion 70 or 72 has a ridge 80 or 82 extending along the inner periphery of the recess. The ridge 80 or 82 is capable of fitting into the engagement groove 22 or 38 of the tool being held in the recess.

A pawl 71 for preventing disengagement of the tool holder 10 held in the first holding portion 70 is capable of projecting from and retracting from the associated surface of the arm section 68A. When the pawl 71 is projected, it engages with the engagement groove 22 of the tool holder 10, thereby securely holding the tool holder 10 in cooperation with the ridge 80. The projecting and retracting action of the pawl 71 should preferably be controlled in such a manner as to be interlocked with control of the operation of the automatic tool-replacement arm 64.

Another embodiment of the disengagement preventing pawl will be described while FIGS. 4 and 5 will be again referred to. As shown in FIG. 4, this alternative embodiment features a holding lever 84 as a substitute for the above-described pawl 73 of the second holding portion 72 shown in FIG. 2. The holding lever 84 is swingably supported by the body of the arm section 68A through a pin 86. A coil spring 88 interposed between the body of the arm section 68A and the holding lever 84 urges the holding lever 84 toward the position indicated by two-dot chain lines in FIG. 4. When the holding lever 84 is at this position, a contact portion 90 on one side of of the lever 84 is positioned within the circular-arc described by the first holding portion 70.

By virtue of this arrangement, when a tool holder 10 becomes completely held in the first holding portion 70, the holding lever 84 has its contact portion 90 pushed aside by the tool holder 10 whereby the lever 84 is swung about the pin 86 in the counterclockwise direction, as viewed in FIG. 4. At this time, a nozzle 24 is already fitted in the second holding portion 72. Therefore, the distal end of the holding lever 84 comes into engagement with the engagement groove 38 of the nozzle 24 in the second holding portion 72, thereby securely holding the nozzle 24 in cooperation with the ridge 82 of the second holding portion 72. If a projection 92 is formed at the distal end of the holding lever 84 and on the side facing the second holding portion 72, this is preferable because the lever 84 is able to engage with the engagement groove 38 more positively.

In the above-described embodiments, the portion of the main body 12 of the machine tool to which the nozzle mounting block 30 is fixed may be constructed as being able to turn relative to the spindle head of the main body 12 to which the tool holder 10 is connected. In this arrangement, as the tool holder 10 moves relative to the workpiece, the opening 26 of the nozzle 24 turns in such a manner that coolant is always ejected toward the pertinent position.

Although the foregoing embodiments show an example in which tools to be mounted on the main body 12 of the machine are tool holders 10 and nozzles 24, the present invention is not limited thereto. The present invention may be applied to various cases such as the case where a plurality of tool holders holding various machining tools are mounted on the main body.

Further, although in the foregoing embodiments two holding portions are provided in the automatic tool-replacement arm, this is a mere example, and the present invention includes other cases such as the case where three or more holding portions are provided. In addition, during the mounting or dismounting of tools, it is not necessary that all of the holding portions of the automatic tool-replacement arm be used. For instance, an arm having three holding portions may hold one or two tools to mount them on or dismount them from a certain location.

As described above, according to the present invention, since an automatic tool-replacement arm has a plurality of tool holding portions, an advantageous effect is provided, in which the desired number of tools can be replaced by one-time operation of a single automatic tool-replacement arm.

We claim:

1. An automatic tool-replacement apparatus comprising:
   a machine tool;
   a plurality of tools adapted to be juxtaposed and dismountably mounted on a body of said machine tool; and
   an automatic tool-replacement arm for holding said tools so that said tools will be mounted on said body of said machine tool or dismounted therefrom, said arm having a plurality of holding portions for holding said plurality of tools, wherein said plurality of tools includes a rotary tool connectable to a spindle of said machine tool, and a nozzle for ejecting a coolant toward a blade of said rotary tool.

2. An apparatus according to claim 1, wherein each of said holding portions of said automatic tool-replacement arm has a configuration which complementarily fits the outer peripheral configuration of the corresponding tool to be held by the holding portion, each holding portion being engageable with at least part of the outer periphery of the corresponding tool.

3. An apparatus according to claim 2, wherein each of said plurality of tools has an engagement groove formed on the outer periphery thereof, while each of said holding portions has a projection engageable with the engagement groove of the corresponding tool.

4. An apparatus according to claim 1, further comprising a holding aid means provided in each of said plurality of holding portions for preventing the corresponding tool positioned in the holding portion from becoming disengaged.

5. An apparatus according to claim 4, wherein said holding aid means comprises a pawl engageable with a part of the outer periphery of the tool positioned in the holding portion which is not in engagement with the holding portion.

6. An apparatus according to claim 5, wherein the holding aid means provided in at least one of said holding portions comes into engagement with the tool positioned in said at least one holding portion, said holding aid means being interlocked with an engagement to be established between a second holding portion adjacent to said at least one holding portion and a tool to be held in said second holding portion.

7. An apparatus according to claim 6, wherein said holding aid means provided in said at least one holding portion comprises a lever swingably supported by the body of said holding portion between an engagement position which said lever reaches after advancing toward said holding portion and a retracting position which said lever reaches after retracting away from said holding portion, and wherein said lever extends to the inside of said second holding portion while being positioned at said retracting position, and when said lever is pushed forward by said tool becoming engaged with said second holding portion, said lever swings to said engagement position.

8. An apparatus according to claim 7, further comprising an urging means for urging said lever toward said retracting position.

9. An apparatus according to claim 5, wherein said pawl of said holding aid means advances toward and retracts away from said holding portion in an interlocking relation with the action of said automatic tool-replacement arm.

* * * * *